United States Patent
Lo (10) Patent No.: US 11,720,162 B2
(45) Date of Patent: Aug. 8, 2023

(54) SERVER AND METHOD OF ADJUSTING POWER CONSUMPTION OF THE SERVER

(71) Applicant: MITAC COMPUTING TECHNOLOGY CORPORATION, Taoyuan (TW)

(72) Inventor: Chi-Jung Lo, Taoyuan (TW)

(73) Assignee: MITAC COMPUTING TECHNOLOGY CORPORATION, Taoyuan (TW)

(*) Notice: Subject to any disclaimer, the term of this patent is extended or adjusted under 35 U.S.C. 154(b) by 0 days.

(21) Appl. No.: 17/456,816

(22) Filed: Nov. 29, 2021

(65) Prior Publication Data

US 2022/0179476 A1 Jun. 9, 2022

(30) Foreign Application Priority Data

Dec. 4, 2020 (TW) ................. 109142776

(51) Int. Cl.
*G06F 1/3234* (2019.01)

(52) U.S. Cl.
CPC ................. *G06F 1/3234* (2013.01)

(58) Field of Classification Search
CPC ............ G06F 1/3234; G06F 11/3058
See application file for complete search history.

(56) References Cited

U.S. PATENT DOCUMENTS

| | | | | |
|---|---|---|---|---|
| 11,340,646 B1* | 5/2022 | Huang | ................. | G06F 1/324 |
| 2006/0082222 A1* | 4/2006 | Pincu | ................. | G06F 1/3203 307/29 |
| 2009/0125737 A1* | 5/2009 | Brey | ................. | G06F 1/3203 713/320 |
| 2011/0083021 A1* | 4/2011 | Floyd | ................. | G06F 1/324 713/300 |
| 2017/0038812 A1* | 2/2017 | Muccini | ................. | G06F 1/30 |
| 2017/0228005 A1* | 8/2017 | Ito | ................. | G06F 1/266 |
| 2018/0101213 A1* | 4/2018 | Mirjafari | ................. | G06F 1/3296 |

(Continued)

FOREIGN PATENT DOCUMENTS

| | | |
|---|---|---|
| TW | 200719217 A | 5/2007 |
| TW | 202006507 A | 2/2020 |

OTHER PUBLICATIONS

Search Report appended to an Office Action, which was issued to Taiwanese counterpart application No. 109142776 by the TIPO dated Apr. 11, 2022, with an English translation thereof.

(Continued)

*Primary Examiner* — Aurel Prifti
(74) *Attorney, Agent, or Firm* — Lewis Roca Rothgerber Christie LLP (57) ABSTRACT

A method of adjusting power consumption of a server is implemented by a baseboard management controller (BMC). The server includes the BMC and a processing module that are connected to each other. The BMC is connected to a power supply for receiving electrical energy supplied thereby, and the processing module operates based on the electrical energy thus received according to a current setting value of a power consumption limit. The method includes steps of: obtaining consecutive values of power conveyed by the power supply to the server; and based on the values of power currently obtained, adjusting the current setting value of the power consumption limit to be within a defined range.

12 Claims, 4 Drawing Sheets

Continuously obtaining values of power consumed by the power supply for supplying the electrical energy to the server — A Adjusting the current setting value of power consumption limit according to the values of power — B (56) References Cited

U.S. PATENT DOCUMENTS

| | | | |
|---|---|---|---|
| 2020/0097057 A1* | 3/2020 | Tseng | H05K 7/1492 |
| 2020/0210304 A1* | 7/2020 | Wang | G06F 11/0706 |
| 2021/0223844 A1* | 7/2021 | Liu | G06F 1/28 |
| 2022/0302974 A1* | 9/2022 | Kuriyama | H04B 7/086 |

OTHER PUBLICATIONS

Search Report appended to an Office Action, which was issued to Taiwanese counterpart Application No. 109142776 by the TIPO dated Dec. 1, 2021 with an English translation thereof.

* cited by examiner

SERVER AND METHOD OF ADJUSTING POWER CONSUMPTION OF THE SERVER

CROSS-REFERENCE TO RELATED APPLICATION

This application claims priority of Taiwanese Invention Patent Application No. 109142776, filed on Dec. 4, 2020.

FIELD

The disclosure relates to a server, and a method of adjusting power consumption of the server.

BACKGROUND

Conventionally, in consideration of energy efficiency, a processor of a server is switched from a normal mode to a sleep mode or stops operating to reduce power consumption thereof when a value of overall power consumption of the server has reached a preset upper limit. However, the processor in the sleep mode is usually unable to respond to a command for completing a task as in the normal mode. Additionally, the processor requires a relatively long time to wake up from the sleep mode and operate in the normal mode, and other components of the server may not function normally during wakeup of the processor, resulting in a crash of the server. Moreover, switching the processor from the sleep mode directly to the normal mode when the value of overall power consumption has reached a preset lower limit may impact stability of operation of the server.

SUMMARY

Therefore, an object of the disclosure is to provide a server and a method of adjusting power consumption thereof that can alleviate at least one of the drawbacks of the prior art.

According to one aspect of the disclosure, the server is adapted to receive electrical energy supplied by a power supply.

The server includes a baseboard management controller (BMC) that is electrically connected to the power supply for receiving the electrical energy, and a processing module that is electrically connected to the BMC. The processing module is configured to operate based on the electrical energy received according to a current setting value of a power consumption limit.

The BMC is configured to obtain a series of consecutive values of power conveyed by the power supply to the server, and to adjust, based on the values of power currently obtained, the current setting value of the power consumption limit to be within a range from a preset standard lower limit to a preset standard upper limit.

According to another aspect of the disclosure, the method is implemented by the BMC previously mentioned, and includes steps of:

obtaining a series of consecutive values of power conveyed by the power supply to the server; and based on the values of power currently obtained, adjusting the current setting value of the power consumption limit to be within a range from a preset standard lower limit to a preset standard upper limit.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
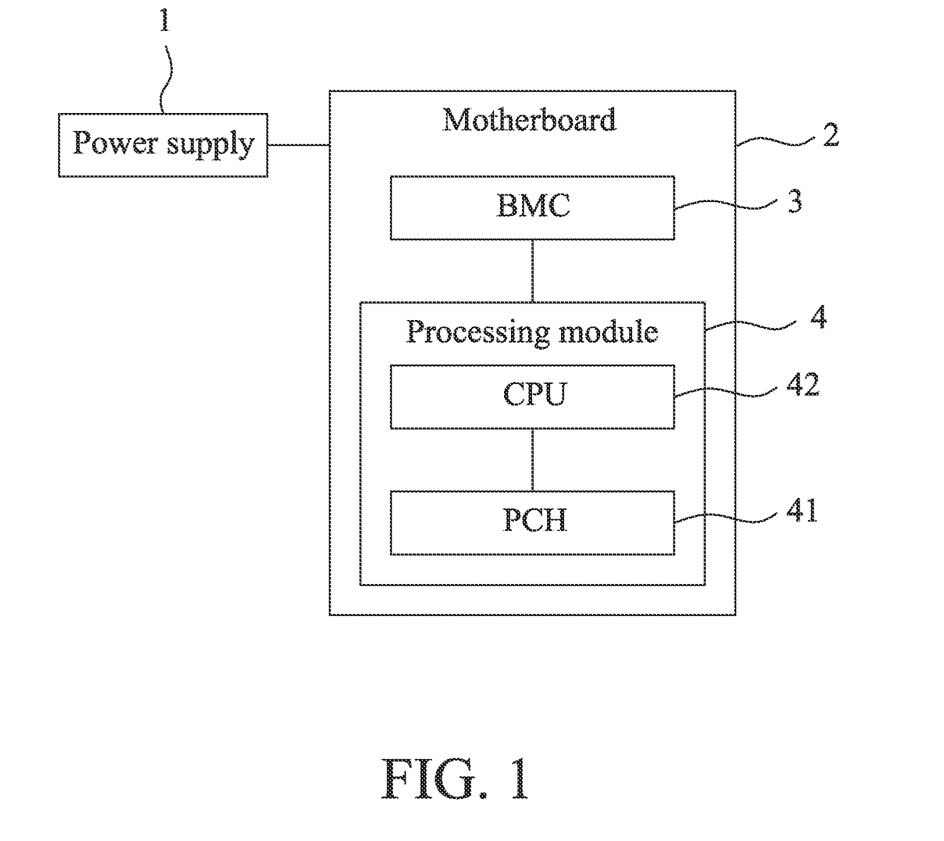
FIG. 1 is a block diagram illustrating a server according to an embodiment of the disclosure.

Referring to FIG. 1, an embodiment of a server according to the disclosure is illustrated. The server is adapted to receive electrical energy supplied by a power supply 1. The server includes a motherboard 2, and a baseboard management controller (BMC) 3 and a processing module 4 that are mounted on the motherboard 2. The server further includes a chassis (rack) (not shown) accommodating the motherboard 2, the BMC 3, the processing module 4 and other components of the server.

The power supply 1 includes a power converter and a power protection unit (not shown). The power protection unit is, for example, a surge protector. The power converter is configured to convert alternating current (AC) electric power to direct-current (DC) electric power. Optionally, the power supply 1 is further connected to a distribution board that is configured to distribute the DC electric power thus converted to multiple receivers. Since implementation of the power supply 1 has been well known to one skilled in the relevant art, detailed explanation of the same is omitted herein for the sake of brevity.

It is worth to note that in one embodiment, the power supply 1 is an external device to the server, and may function independently of the server or may be controlled by the BMC 3. When the power supply 1 is controlled by the BMC 3, a user is allowed to adjust, through the BMC 3, power consumption settings of the power supply 1 that are related to the server so as to enable the power supply 1 to supply electrical energy to the server based on the power consumption settings. In one embodiment, the power supply 1 is included in the server. More specifically, in an embodiment where the server includes the power supply 1 as an internal component, the power supply may be mounted on the motherboard 2, positioned inside the chassis in the same partition as the motherboard 2, positioned inside the chassis in a partition separate from a partition where the motherboard 2 is disposed, or mounted on the chassis.

In practice, to use one power supply for supplying electrical energy to two servers that are both connected to a backplane, the power supply is directly connected to each of the two servers, or is connected to the two servers through an electric cable. Alternatively, the two servers are connected to the power supply through the backplane.

To use two power supplies for supplying electrical energy to four servers that are all connected to a backplane, the two power supplies are both connected to a distribution board, and the distribution board is directly connected to each of the four servers through electric cables. Alternatively, two of the four servers are directly connected to the distribution board for receiving electrical energy from the power supplies, and the other two of the four servers are connected to the distribution board through the backplane.

The BMC 3 is electrically connected to the power supply 1 for receiving the electrical energy.

The processing module 4 is electrically connected to the BMC 3, and is configured to operate based on the electrical energy thus received according to a current setting value of a power consumption limit. It should be noted that the motherboard 2 and other hardware components mounted thereon are controlled by the processing module 4 and also operate based on the electrical energy received. One skilled in the art would appreciate that the lower the setting value of the power consumption limit, the lower the power consumption of the processing module 4, and thus the lower the performance of the processing module 4.

The processing module 4 includes a central processing unit (CPU) 41 and a platform controller hub (PCH) 42. The PCH 42 is electrically connected between the CPU 41 and the BMC 3. It should be noted that the CPU 41 and the PCH 42 may be implemented to be two individual chips, or may be integrated as a chipset or a single chip.

The BMC 3 is configured to obtain a series of consecutive values of power conveyed by the power supply 1 to the server. That is to say, the BMC 3 is configured to consecutively obtain a series of values of power of the electrical energy supplied by the power supply 1 to the server. The BMC 3 is further configured to adjust, by sending an actuating command to the processing module 4 based on the values of power currently obtained, the current setting value of the power consumption limit to be within a range from a preset standard lower limit (e.g., 70 W) to a preset standard upper limit (e.g., 180 W). The preset standard upper limit corresponds to a value of power consumption of the processing module 4 when the processing module 4 operates with the highest performance (e.g., runs at a highest clock rate). The preset standard lower limit corresponds to a value of power consumption of the processing module when the processing module 4 operates with the lowest performance without stopping operating and is still functional to respond to commands (e.g., runs at a low clock rate, or postpones or cancels one or more tasks that are being executed and that are non-necessary or non-critical).

It is worth to note that the BMC 3 operates by executing firmware of the BMC 3. It is worth to note that the current setting value of the power consumption limit may be related to power consumption of the CPU 41, or related to overall power consumption of the processing module 4 (i.e., including power consumption of the CPU 41 and that of the PCH 42).

For example, the CPU 41 is produced by Advanced Micro Devices (AMD), Inc., and includes a power control unit (PCU). The PCU provides a communication service interface "mailbox service" so as to enable the BMC 3 to adjust the current setting value of the power consumption limit by issuing an AMD CPU mailbox command to the CPU 41.

In one embodiment where the CPU 41 is produced by a manufacturer other than Advanced Micro Devices, Inc. (AMD), the BMC 3 is enabled to adjust the current setting value of the power consumption limit based on parameters or commands received by the BMC 3.

Figure 2:
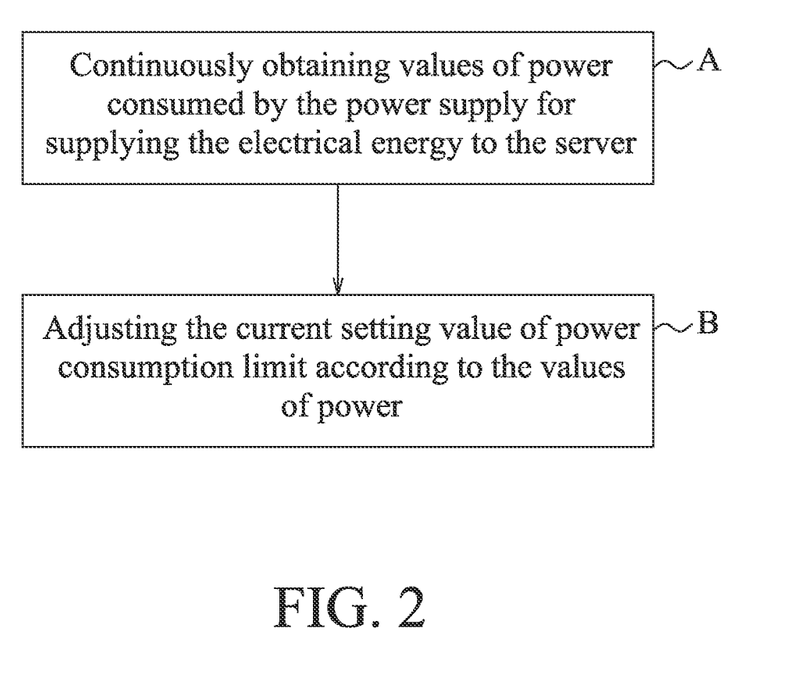
FIGS. 2 to 4 are flow charts cooperatively illustrating a method of adjusting power consumption of a server according to embodiments of the disclosure.
Figure 3:
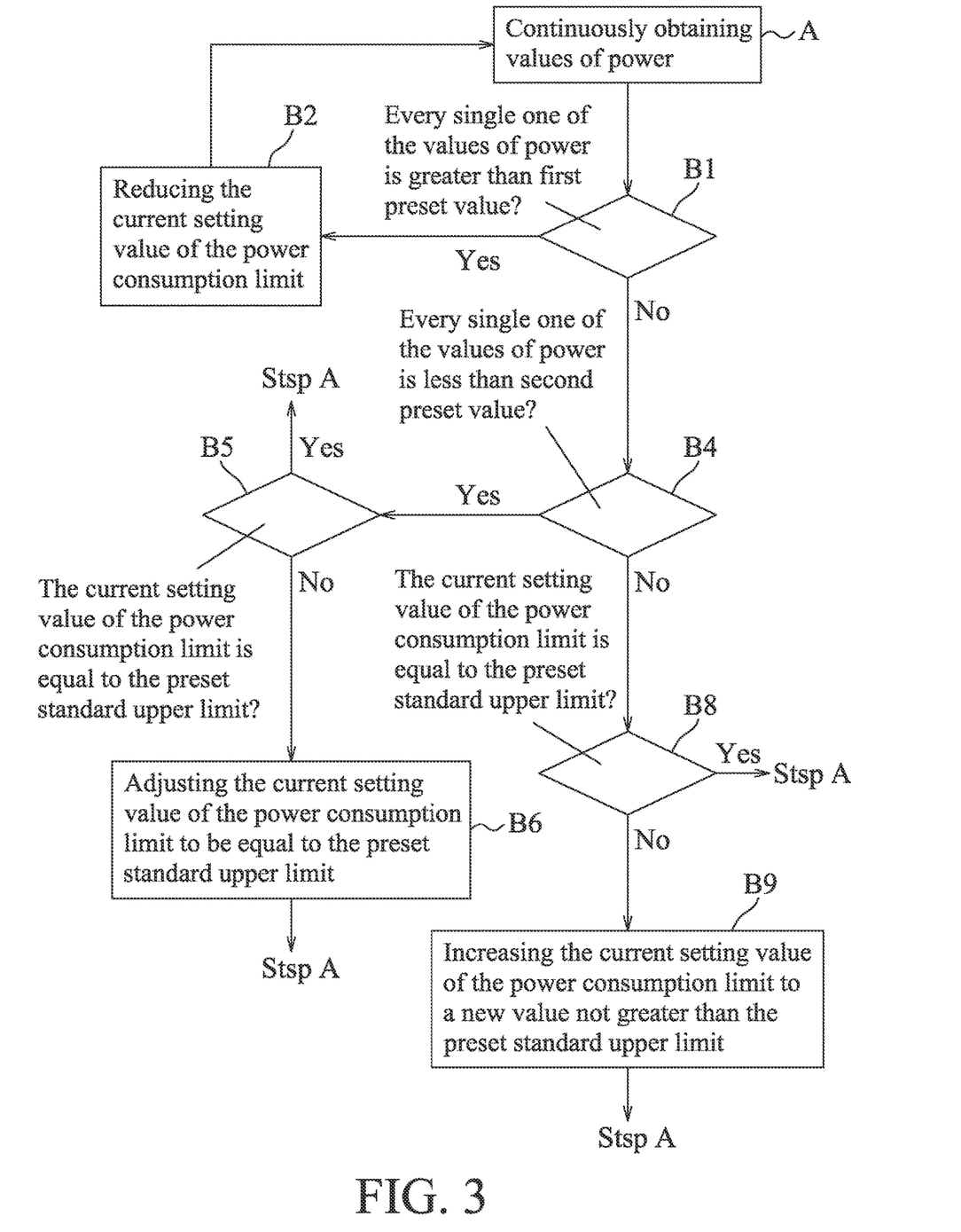
Figure 4:
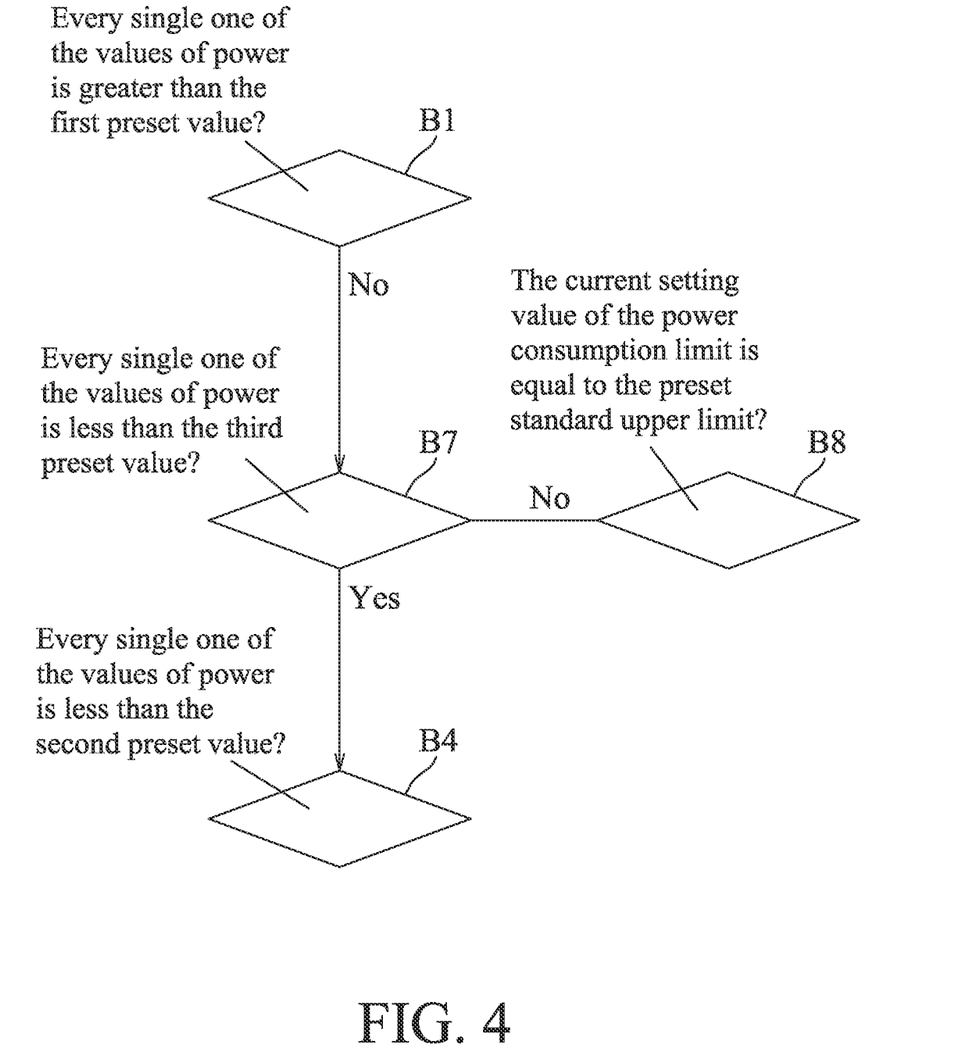

Referring to FIGS. 2 to 4, an embodiment of a method of adjusting power consumption of the server according to the disclosure is illustrated. The method includes steps (A) and (B) delineated below.

In step (A), the BMC 3 obtains a series of consecutive values of power conveyed by the power supply 1 to the server. In one embodiment, the BMC 3 passively receives the values of power that are periodically (e.g., at a frequency of 1 Hz or 10 Hz, but not limited thereto) sent by the power supply 1 when the power supply 1 supplies the electrical energy to the server. In one embodiment, the BMC 3 actively and periodically sends to the power supply 1 a request for a value of power conveyed by the power supply 1 to the server, and the power supply 1 responds to the request by transmitting, to the BMC 3, a value of power currently conveyed by the power supply 1 to the server.

It is worth to note that in one embodiment, the power supply 1 and the BMC 3 directly communicate with each other for the BMC 3 to receive the values of power from the power supply 1. In one embodiment, the power supply 1 and the BMC 3 communicate with each other through a backplane, to which the server is connected.

In the cases that a plurality of power supplies are used to supply electrical energy to a plurality of servers, one of the power supplies will be designated as a master power supply, and the BMC of each of the servers obtains from the master power supply a series of consecutive values of power conveyed by the power supplies to the server that includes the BMC. Alternatively, the BMC of a representative one of the servers obtains from the master power supply the values of power conveyed by the power supplies to the servers, and then the BMC of the representative one of the servers forwards the values of power thus obtained to their corresponding ones of the servers.

In step (B), based on the values of power currently obtained, the BMC 3 adjusts the current setting value of the power consumption limit to be within the range from the preset standard lower limit to the preset standard upper limit. It is worth to note that since adjusting power consumption of the processing module 4 will affect power consumption of the motherboard 2 and other hardware components, and the power consumption of the processing module 4 accounts for the vast majority of the total power consumption of the server, adjusting the power consumption of the processing module 4 will directly affect the total power consumption of the server. Because only the power consumption of a single component (i.e., the processing module 4) is to be monitored and adjusted by the BMC 3 to manage the total power consumption of the server, such approach has the following benefits: that the BMC 3 performs complex control on a reduced number of components; and that a simplified control scheme is implemented by the BMC 3 to manage the total power consumption of the server. Hence, workloads of the BMC 3 may be alleviated, and the server may utilize the electrical energy supplied by the power supply 1 in an efficient manner.

In some embodiments, the BMC 3 adjusts the current setting value of the power consumption limit by a preset adjustment value each time. The preset adjustment value is one of a coarse adjustment value (e.g., 10 W) and a fine adjustment value (e.g., 5 W), where the coarse adjustment value is greater than the fine adjustment value. That is to say, for each adjustment of the current setting value of the power consumption limit, the BMC 3 increases or decreases the current setting value of the power consumption limit by the coarse adjustment value or the fine adjustment value.

Specifically, as shown in FIG. 3, step (B) includes sub-steps (B1), (B2), (B4), (B5), (B6), (B8) and (B9) delineated below.

In sub-step (B1), the BMC 3 determines whether every single one of the values of power obtained in step (A) is greater than a first preset value (e.g., 280 W). More specifically, in one embodiment, the BMC 3 determines whether a repeated-high-power event has occurred, wherein the repeated-high-power event is that the values of power that are obtained in a preset time period (e.g., 10 seconds) are each greater than the first preset value. In one embodiment, the BMC 3 determines whether the repeated-high-power event has consecutively occurred for a first predetermined number of times (e.g., ten times). The BMC 3 determines that every single one of the values of power is greater than the first preset value when determining that the repeated-high-power event has consecutively occurred for the first predetermined number of times. It is worth to note that a condition where every single one of the values of power is greater than the first preset value corresponds to a situation that the server as a whole excessively consumes the electrical energy supplied by the power supply 1 (i.e., the total power consumption of the server is too high).

When it is determined that every single one of the values of power is greater than the first preset value in sub-step (B1), a procedure flow of the method proceeds to sub-step (B2). Otherwise, when it is determined that any one of the values of power is not greater than the first preset value, the procedure flow proceeds to sub-step (B4).

In sub-step (B2), the BMC 3 reduces the current setting value of the power consumption limit.

More specifically, in sub-step (B2), the BMC 3 first determines whether the current setting value of the power consumption limit is equal to the preset standard upper limit.

When it is determined that the current setting value of the power consumption limit is equal to the preset standard upper limit, the BMC 3 decreases the current setting value of the power consumption limit by the coarse adjustment value. Then, the procedure flow returns to step (A), and the BMC 3 repeats steps (A) and (B). It should be noted that the BMC 3 would adjust the current setting value of the power consumption limit to be the preset standard lower limit when it is determined that decreasing the current setting value of the power consumption limit by the coarse adjustment value would result in the current setting value of the power consumption limit to be less than or to be equal to the preset standard lower limit.

When it is determined that the current setting value of the power consumption limit is not equal to the preset standard upper limit, the BMC 3 decreases the current setting value of the power consumption limit by the fine adjustment value. Then, the procedure flow returns to step (A), and the BMC 3 repeats steps (A) and (B). Similarly, the BMC 3 would adjust the current setting value of the power consumption limit to be the preset standard lower limit when it is determined that decreasing the current setting value of the power consumption limit by the fine adjustment value would result in the current setting value of the power consumption limit to be smaller than the preset standard lower limit.

In this way, power consumption of the processing module 4 may be reduced. Moreover, since the CPU 41 of the processing module 4 does not stop operating and is not switched to a sleep mode, the processing module 4 is still functional to respond to commands. Hence, energy efficiency and stability of operation of the server may be ensured at the same time.

In sub-step (B4), the BMC 3 determines whether every single one of the values of power obtained is less than a second preset value (e.g., 200 W) that is smaller than the first preset value. More specifically, in one embodiment, the BMC 3 determines whether a repeated-low-power event has occurred, where the repeated-low-power event is that the values of power that are obtained in the preset time period are each less than the second preset value. In one embodiment, the BMC 3 determines whether the repeated-low-power event has occurred for a second predetermined number of times (e.g., ten times). The BMC 3 determines that every single one of the values of power is less than the second preset value when determining that the repeated-low-power event has consecutively occurred for the second predetermined number of times. It is worth to note that a condition where every single one of the values of power is less than the second preset value corresponds to a situation that the total power consumption of the server is relatively low and thus the amount of the electrical energy supplied by the power supply 1 to the server is relatively small. It is worth to note that the first preset value and the second preset value cooperatively define a numerical range of the power conveyed by the power supply 1 for supplying the electrical energy that allows the server to operate normally.

When it is determined that every single one of the values of power is less than the second preset value in sub-step (B4), the procedure flow proceeds to sub-step (B5). On the other hand, when it is determined that any one of the values of power is not less than the second preset value, the procedure flow proceeds to sub-step (B8).

In sub-step (B5), the BMC 3 determines whether the current setting value of the power consumption limit is equal to the preset standard upper limit. When it is determined that the current setting value of the power consumption limit is equal to the preset standard upper limit, the procedure flow goes back to step (A), and the BMC 3 repeats steps (A) and (B). Oppositely, when it is determined that the current setting value of the power consumption limit is not equal to the preset standard upper limit, the procedure flow proceeds to sub-step (B6).

In sub-step (B6), the BMC 3 adjusts the current setting value of the power consumption limit to be equal to the preset standard upper limit so as to enable the processing module 4 to operate with a relatively higher performance. Then, the procedure flow goes back to step (A), and the BMC 3 repeats steps (A) and (B).

In sub-step (B8), the BMC 3 determines whether the current setting value of the power consumption limit is equal to the preset standard upper limit. When it is determined that the current setting value of the power consumption limit is equal to the preset standard upper limit, the procedure flow goes back to step (A), and the BMC 3 repeats steps (A) and (B). Otherwise, when it is determined that the current setting value of the power consumption limit is not equal to the preset standard upper limit, the procedure flow proceeds to sub-step (B9).

In sub-step (B9), the BMC 3 increases the current setting value of the power consumption limit to a new value that is not greater than the preset standard upper limit. In particular, the BMC 3 increases the current setting value of the power consumption limit of the processing module 4 by the fine adjustment value. It should be noted that the BMC 3 may adjust the current setting value of the power consumption limit to be equal to the preset standard upper limit when it is determined that increasing the current setting value of the power consumption limit by the fine adjustment value would cause the current setting value of the power consumption limit to be greater than the preset standard upper limit. Subsequently, the procedure flow goes back to step (A), and the BMC 3 repeats steps (A) and (B).

Referring to FIG. 4, in a variant embodiment, step (B) further includes a sub-step (B7) between sub-steps (B1) and (B4). In sub-step (B7), the BMC 3 determines whether every single one of the values of power is less than a third preset value (e.g., 250 W) that is smaller than the first preset value and greater than the second preset value. More specifically, in one embodiment, the BMC 3 determines whether every single one of the values of power that are obtained in the preset time period is less than the third preset value. In one embodiment, the BMC 3 determines whether every single one of a third predetermined number (e.g., ten) of the values of power that are obtained is less than the third preset value. It is worth to note that the first preset value and the third preset value cooperatively define a preferred numerical range of the power conveyed by the power supply 1 that allows the server to operate with the greatest performance. When it is determined that every single one of the values of power is less than the third preset value, the procedure flow proceeds to sub-step (B4). On the other hand, when it is determined that any one of the values of power is not less than the third preset value, the procedure flow proceeds to sub-step (B8).

For better explanation, examples of applying the method previously mentioned are described below. For example, the preset standard lower limit is 70 W, the preset standard upper limit is 180 W, the first preset value is 280 W, the second preset value is 200 W, the third preset value is 250 W, the coarse adjustment value is 10 W, the fine adjustment value is 5 W, the preset time periods is 10 seconds, and the frequency, at which the BMC 3 obtains the values of power from the power supply 1, is 1 Hz.

In a scenario where the BMC 3 determines in sub-step (B1) that every single one of ten values of power that are consecutively obtained in 10 seconds is greater than 280 W, the BMC 3 determines in sub-step (B2) whether the current setting value of the power consumption limit is equal to 180 W. When it is determined in sub-step (B2) that the current setting value of the power consumption limit is equal to 180 W, the BMC 3 decreases the current setting value of the power consumption limit by 10 W. Then, the BMC 3 repeats steps (A) and (B). On the other hand, when it is determined in sub-step (B2) that the current setting value of the power consumption limit is not equal to 180 W, the BMC 3 decreases the current setting value of the power consumption limit by 5 W. Then, the BMC 3 repeats steps (A) and (B).

In a scenario where the BMC 3 determines in sub-step (B1) that at least one of the ten values of power that are consecutively obtained in the 10-second preset time period is not greater than 280 W, the BMC 3 determines in sub-step (B4) whether every single one of the ten values of power that are consecutively obtained in the 10-second preset time period is less than 200 W.

When it is determined in sub-step (B4) that every single one of the ten values of power is less than 200 W, the BMC 3 determines in sub-step (B5) whether the current setting value of the power consumption limit is equal to 180 W. When it is determined in sub-step (B5) that the current setting value of the power consumption limit is equal to 180 W, the BMC 3 repeats steps (A) and (B). Oppositely, when it is determined in sub-step (B5) that the current setting value of the power consumption limit is not equal to 180 W, the BMC 3 executes sub-step (B6) of adjusting the current setting value of the power consumption limit to be equal to 180 W so as to enable the processing module 4 to operate with a relatively higher performance. Then, the BMC 3 repeats steps (A) and (B).

When it is determined in sub-step (B4) that any one of the ten values of power is not less than 200 W, the BMC 3 determines in sub-step (B8) whether the current setting value of the power consumption limit is equal to 180 W. When it is determined in sub-step (B8) that the current setting value of the power consumption limit is equal to 180 W, the BMC 3 repeats steps (A) and (B). Otherwise, when it is determined in sub-step (B8) that the current setting value of the power consumption limit is not equal to 180 W, the BMC 3 increases the current setting value of the power consumption limit by 5 W in sub-step (B9), and then repeats steps (A) and (B).

For the variant embodiment of the method shown in FIG. 4, in a scenario where the BMC 3 determines in sub-step (B1) that at least one of the ten values of power that are consecutively obtained in the 10-second preset time period is not greater than 280 W, the BMC 3 determines in sub-step (B7) whether every single one of the ten values of power that are consecutively obtained in the 10-second preset time period is less than 250 W before sub-step (B4).

It is worth to note that some parameters used in the method of adjusting the power consumption of the server can be set, for optimizing the server, in a basic input/output system (BIOS) that is executed by the processing module 4 of the server in a booting process of the server. The parameters include, but not limited to, the preset standard upper limit, the preset standard lower limit, the first preset value, the second preset value, the third preset value, the coarse adjustment value and the fine adjustment value.

To sum up, the method of adjusting power consumption of a server according to the disclosure utilizes the BMC 3 to obtain values of power conveyed by the power supply 1 to the server, and to adjust, based on the values of power currently thus obtained, the current setting value of the power consumption limit of the processing module 4, according to which the processing module 4 operates. In this way, energy efficiency and stability of operation of the server may be ensured at the same time, and flexibility of energy management of the server may be enhanced.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method of adjusting power consumption of a server, the server including a baseboard management controller (BMC) and a processing module, the processing module including a central processing unit (CPU), the BMC being electrically connected to a power supply for receiving electrical energy supplied by the power supply, the processing module being electrically connected to the BMC and operating based on the electrical energy thus received according to a current setting value of a power consumption limit that is only related to power consumption of the CPU of the processing module, the method comprising steps of:

the BMC obtaining a series of consecutive values of power conveyed by the power supply to the server; and
based on the values of power currently obtained, the BMC adjusting the current setting value of the power consumption limit to be within a range from a preset standard lower limit to a preset standard upper limit,
wherein the step of adjusting the current setting value of the power consumption limit includes sub-steps of:
   determining whether every single one of the values of power is greater than a first preset value; and
   when it is determined that every single one of the values of power is greater than the first preset value, reducing the current setting value of the power consumption limit.

2. The method as claimed in claim 1, wherein the step of adjusting the current setting value of the power consumption limit further includes sub-steps of:
   when it is determined that any one of the values of power is not greater than the first preset value, determining whether every single one of the values of power is less than a second preset value that is smaller than the first preset value; and
   when it is determined that every single one of the values of power is less than the second preset value,
   determining whether the current setting value of the power consumption limit is equal to the preset standard upper limit, and
   when it is determined that the current setting value of the power consumption limit is not equal to the preset standard upper limit, adjusting the current setting value of the power consumption limit to be equal to the preset standard upper limit, and repeating the steps of obtaining a series of consecutive values of power conveyed by the power supply to the server, and adjusting the current setting value of the power consumption limit based on the values of power currently obtained.

3. The method as claimed in claim 2, wherein the step of adjusting the current setting value of the power consumption limit further includes a sub-step of:
   when it is determined that the current setting value of the power consumption limit is equal to the preset standard upper limit, repeating the steps of obtaining a series of consecutive values of power conveyed by the power supply to the server, and adjusting the current setting value of the power consumption limit based on the values of power currently obtained.

4. The method as claimed in claim 2, wherein the step of adjusting the current setting value of the power consumption limit further includes sub-steps of, when it is determined that any one of the values of power is not less than the second preset value:
   determining whether the current setting value of the power consumption limit is equal to the preset standard upper limit;
   when it is determined that the current setting value of the power consumption limit is equal to the preset standard upper limit, repeating the steps of obtaining a series of consecutive values of power conveyed by the power supply to the server, and adjusting the current setting value of the power consumption limit based on the values of power currently obtained; and
   when it is determined that the current setting value of the power consumption limit is not equal to the preset standard upper limit, increasing the current setting value of the power consumption limit to a new value that is not greater than the preset standard upper limit.

5. The method as claimed in claim 2, wherein the sub-step of determining whether every single one of the values of power is less than a second preset value includes one of:
   determining whether a repeated-low-power event has occurred, wherein the repeated-low-power event is that every single one of the values of power that are obtained in a preset time period is less than the second preset value; and
   determining whether the repeated-low-power event has consecutively occurred for a predetermined number of times.

6. The method as claimed in claim 1, wherein the sub-step of determining whether every single one of the values of power is greater than a first preset value includes one of:
   determining whether a repeated-high-power event has occurred, wherein the repeated-high-power event is that every single one of the values of power that are obtained in a preset time period is greater than the first preset value; and
   determining whether the repeated-high-power event has consecutively occurred for a predetermined number of times.

7. A server adapted to receive electrical energy supplied by a power supply, said server comprising:
   a baseboard management controller (BMC) adapted to be electrically connected to the power supply for receiving the electrical energy; and
   a processing module electrically connected to said BMC, including a central processing unit (CPU), and configured to operate based on the electrical energy thus received according to a current setting value of a power consumption limit that is only related to power consumption of the CPU of the processing module,
   wherein said BMC is configured to implement operations of obtaining a series of consecutive values of power conveyed by the power supply to said server, and
   adjusting, based on the values of power currently obtained, the current setting value of the power consumption limit to be within a range from a preset standard lower limit to a preset standard upper limit,
   wherein said BMC is further configured to determine whether every single one of the values of power is greater than a first preset value, and
   when it is determined that every single one of the values of power is greater than the first preset value, reduce the current setting value of the power consumption limit.

8. The server as claimed in claim 7, wherein said BMC is further configured to:
   when it is determined that any one of the values of power is not greater than the first preset value, determine whether every single one of the values of power is less than a second preset value that is smaller than the first preset value; and
   when it is determined that every single one of the values of power is less than the second preset value,
   determine whether the current setting value of the power consumption limit is equal to the preset standard upper limit, and
   when it is determined that the current setting value of the power consumption limit is not equal to the preset standard upper limit, adjust the current setting value of the power consumption limit to be equal to the preset standard upper limit, and repeat the operations of obtaining a series of consecutive values of power conveyed by the power supply to said server, and adjusting the current setting value of the power consumption limit based on the values of power currently obtained.

9. The server as claimed in claim 8, wherein said BMC is further configured to, when it is determined that the current setting value of the power consumption limit is equal to the preset standard upper limit, repeat the operations of obtaining a plurality of values of power conveyed by the power supply to said server, and adjusting the current setting value of the power consumption limit based on the values of power currently obtained.

10. The server as claimed in claim 8, wherein said BMC is further configured, when it is determined that any one of the values of power obtained in a preset time period is not less than the second preset value, to:
   determine whether the current setting value of the power consumption limit is equal to the preset standard upper limit;
   when it is determined that the current setting value of the power consumption limit is equal to the preset standard upper limit, repeat the operations of obtaining a series of consecutive values of power conveyed by the power supply to said server, and adjusting the current setting value of the power consumption limit based on the values of power currently obtained; and
   when it is determined that the current setting value of the power consumption limit is not equal to the preset standard upper limit, increase the current setting value of the power consumption limit to a new value that is not greater than the preset standard upper limit.

11. The server as claimed in claim 8, wherein said BMC is configured to determine whether every single one of the values of power is less than the second preset value by one of:
   determining whether a repeated-low-power event has occurred, wherein repeated-low-power event is that every single one of the values of power that are obtained in a preset time period is less than the second preset value; and
   determining whether the repeated-low-power event has consecutively occurred for a predetermined number of times.

12. The server as claimed in claim 7, wherein said BMC is configured to determine whether every single one of the values of power obtained is greater than the first preset value by one of:
   determining whether a repeated-high-power event has occurred, wherein the repeated-high-power event is that every single one of the values of power that are obtained in a preset time period is greater than the first preset value; and
   determining whether the repeated-high-power event has consecutively occurred for a predetermined number of times.

* * * * *